US006245345B1

(12) United States Patent
Swanbom et al.

(10) Patent No.: US 6,245,345 B1
(45) Date of Patent: Jun. 12, 2001

(54) FILAMENTOUS POROUS FILMS AND METHODS FOR PRODUCING THE SAME

(75) Inventors: Deryl D. Swanbom; Richard L. Dunn; Michelle Botz; Kenneth C. Godowski; Scott Jeffers, all of Fort Collins, CO (US)

(73) Assignee: Atrix Laboratories, Inc., Fort Collins, CO (US)

( * ) Notice: Subject to any disclaimer, the term of this patent is extended or adjusted under 35 U.S.C. 154(b) by 0 days.

(21) Appl. No.: 09/110,723

(22) Filed: Jul. 7, 1998

(51) Int. Cl.[7] ........................................... A61F 2/00

(52) U.S. Cl. .................. 424/402; 424/422; 424/423; 424/424; 424/426; 424/443

(58) Field of Search ................... 424/402, 443, 424/422, 423, 424, 426, 428

(56) References Cited

U.S. PATENT DOCUMENTS

| | | | |
|---|---|---|---|
| 4,673,649 | 6/1987 | Boyce et al. | 435/240 |
| 4,863,472 | 9/1989 | Tormala et al. | 623/16 |
| 4,923,699 | 5/1990 | Kaufman | 424/427 |
| 4,938,763 | 7/1990 | Dunn et al. | 604/891.1 |
| 4,940,666 | 7/1990 | Boyce et al. | 435/240.2 |
| 4,983,181 | 1/1991 | Civerchia | 623/5 |
| 4,994,081 | 2/1991 | Civerchia et al. | 623/5 |
| 5,077,049 | 12/1991 | Dunn et al. | 424/426 |
| 5,108,428 | 4/1992 | Capecchi et al. | 623/5 |
| 5,112,350 | 5/1992 | Civerchia et al. | 623/5 |
| 5,198,220 | 3/1993 | Damani | 424/426 |
| 5,213,720 | 5/1993 | Civerchia | 264/1.4 |
| 5,242,910 | 9/1993 | Damanj | 514/152 |
| 5,278,201 | 1/1994 | Dunn et al. | 523/113 |
| 5,324,519 | 6/1994 | Dunn et al. | 424/426 |
| 5,342,370 | 8/1994 | Simon et al. | 606/107 |
| 5,399,665 | 3/1995 | Barrera et al. | 528/354 |
| 5,447,725 | 9/1995 | Damani et al. | 424/435 |
| 5,460,939 | 10/1995 | Hansbrough et al. | 435/1.1 |
| 5,487,897 | 1/1996 | Polson et al. | 424/426 |
| 5,489,300 | 2/1996 | Capecchi et al. | 623/5 |
| 5,522,888 | 6/1996 | Civerchia | 623/4 |
| 5,573,544 | 11/1996 | Simon et al. | 606/151 |
| 5,599,552 | 2/1997 | Dunn et al. | 424/423 |
| 5,618,531 | 4/1997 | Cherksey | 424/93.7 |
| 5,632,727 | 5/1997 | Tipton et al. | 602/47 |
| 5,660,849 | 8/1997 | Polson et al. | 424/426 |
| 5,672,336 | * 9/1997 | Sharma | 424/45 |
| 5,702,716 | 12/1997 | Dunn et al. | 424/422 |
| 5,722,950 | 3/1998 | Fujita et al. | 604/48 |
| 5,733,950 | * 3/1998 | Dunn et al. | 523/113 |
| 5,939,323 | * 8/1999 | Valentini et al. | 435/395 |

FOREIGN PATENT DOCUMENTS

| | | | |
|---|---|---|---|
| 629662 | 12/1994 | (EP) | C08L/67/04 |
| 2223027 | 8/1988 | (GB) | A61L/15/00 |

OTHER PUBLICATIONS

Eastman, "When the light fades . . . Macular degeneration in the spotlight", *A.A.R.P. Bulletin*, 2,14 (Jul.–Aug. 1996).

Giordano et al., "Retinal pigment epithelium cells cultured on synthetic biodegradable polymers", *Jour. of Biomed. Materials Research*, 34:87–93 (1997).

(List continued on next page.)

*Primary Examiner*—S. Mark Clardy
*Assistant Examiner*—Kathryne E. Shelborne
(74) *Attorney, Agent, or Firm*—Schwegman, Lundberg, Woessner & Kluth, P.A.

(57) ABSTRACT

The invention is directed to a filamentous porous film that can act as a support for cellular attachment, growth and organization. The film is formed from filaments which define a matrix structure with pores.

21 Claims, 9 Drawing Sheets

OTHER PUBLICATIONS

Gurav et al., "A qualitative in vitro evaluation of the degradable materials poly(caprolactone), poly(hydroxybutyrate) and a poly(hydroxybutyrate)–(hydroxyvalerate) copolymer", *Jour. of Materials Science: Materials in Medicine*, 5:784–787 (1994).

Ishaug et al., "Osteoblast function on synthetic biodegradable polymers", *Jour. of Biomed. Materials Research*, 28:1445–1453 (1994).

Mikos et al., "Preparation of poly(glycolic acid) bonded fiber structures for cell attachment and transplantation", *Jour. of Biomed. Materials Research*, 27:183–189 (1993).

Petit et al., "Tissue Segregation Enhances Calvarial Osteogenesis in Adult Primates", *The Journal of Craniofacial Surgery*, 5:34–43 (Feb. 1994).

Renard et al., "Incorporation of a fluorocarbon polymer implanted at the posterior surface of the rabbit cornea", *Jour. of Biomed. Materials Research*, 31:193–199 (1996).

Ciapetti, G., et al., "A latex membrane, as a alternative device in teh GTR technique: Preliminary report on its biocompatibility", *Journal of Materials Science: Matererials in Medicine*, 5 (9/10), pp. 647–650, (1994).

Pineda, L.M., et al., "Bone regeneration with resorbable polymeric membranes. III. Effect of poly(L–lactide) membrane pore size on the bone healing process in large defects", *Journal of Biomedical Materials Research*, 31 (3), pp. 385–394, (1996).

Shirokaze, J., "Yarn–like or Film–Like Porous Cellulosic Material and its Production", *Patent Abstracts of Japan*, Publication No. 02208330, Publication date Aug. 17, 1990, Application date Feb. 8, 1989 Application No. 01027591, 1, (1989).

* cited by examiner

FILAMENTOUS POROUS FILMS AND METHODS FOR PRODUCING THE SAME

BACKGROUND OF THE INVENTION

Significant benefits can be derived from the ability to grow cells in vitro on biodegradable supports or scaffolds followed by transplantation to a human needing cells for tissue repair or replacement. Cells that could be grown for such tissue engineering include osteoblasts for new bone, chondrocytes for cartilage, fibroblasts for dermal tissue and retinal pigment epithelial cells (RPE) for the eye.

Some research regarding this aspect of tissue engineering has already been reported. For example, Mikos et al, have prepared poly(glycolic acid) bonded fiber structures for cell attachment and transplantation. *J. of Biomedical Materials Research, Vol.* 27, 183–189 (1993). Their preparations involved formation of a composite material between poly (glycolic acid) nonwoven fiber meshes and poly(L-lactic acid) (PLLA) followed by thermal treatment and selective dissolution of the PLLA matrix. Others have investigated porous sheets of polymer for such cell growth. Although the growth of cells on such porous film has been demonstrated, there are difficulties with such an approach.

The task of tissue engineering is complicated by the need of most cells to have special surfaces for attachment, proliferation and cell interactions. Additionally, some cells have distinctly different basal and apical characteristics and are polar in nature so that they function properly only when they are properly oriented.

There is a need, therefore, for a technique to develop and grow cells in vitro in a manner such that they will function properly when implanted. To this end, biodegradable polymers are needed to act as a scaffold or support for the development and growth of such cells. The scaffold should allow the growing cells to organize and develop special cellular function such as cell attachment, proliferation and maintenance of distinct basal and apical characteristics.

SUMMARY OF THE INVENTION

These needs are met by the present invention which provides a biodegradable scaffold for in vitro cell cultures, and a process for preparation of that scaffold. In particular, the biodegradable scaffold provides a suitable support for organization, proper attachment and growth of cells, especially those with special cellular functions.

In general, the invention is directed to the biodegradable scaffold which is composed of a filamentous porous thin film. The invention as well is directed to a process for preparing the filamentous porous film, and a method of using the filamentous porous film to provide a scaffold for cell growth and tissue engineering.

The filamentous, porous film can act as a support for cells to attach, grow and organize, including whose with special functions and those requiring spatial orientation. The film has a matrix structure with two surfaces and is constructed primarily of filaments. The filaments define pores in the matrix structure. The pores extend from one surface to the other surface without a substantial change in the cross sectional dimensions of the pores. The filaments are composed of a pharmaceutically acceptable, biodegradable, thermoplastic polymer that is substantially soluble in a pharmaceutically acceptable organic solvent and substantially insoluble in aqueous medium and body fluid.

The process of the invention is carried out by applying liquid filaments of a flowable thermoplastic polymer solution onto an aqueous medium in such a manner that a solid filamentous porous film forms. By controlling the viscosity of the polymer solution and applying the polymer solution by any technique that forms droplets or small multiple volumes of the solution, the elongated small multiple volumes of solution, i.e., liquid filaments, can be formed which will result in the formation of a solid filamentous, porous film rather than a smooth, nonporous sheet.

The method of using the filamentous, porous film according to the invention involves use of film as a scaffold for cell growth in a cell culture method.

BRIEF DESCRIPTION OF THE DRAWINGS

FIGS. 1 through 3, 8 and 9 illustrate films of the invention.

FIGS. 4 through 7 illustrate other kinds of films.

DETAILED DESCRIPTION OF THE INVENTION

Figure 1:
FIGS. 1 through 9 depict scanning electron micrographs of films.

The filamentous, porous, biodegradable film of the invention provides a scaffold which can act as a support for proper attachment, growth, and organization of cells including those with special functions and/or those requiring spatial orientation. The film is formed of filaments of a pharmaceutically acceptable biodegradable thermoplastic polymer. The filaments are arranged into a matrix, the interfilament spaces of which constitute pores. These pores are substantially uniformly distributed throughout the entire film including its upper and lower surfaces. The matrix arrangement of the filaments forming the film and the pores of the film are effective for allowing and promoting growth of cells, including those for which a special cellular function is preserved. The film of the invention provides a suitable biodegradable scaffold for cell implantation.

The process for forming the filamentous, porous film according to the invention enables the construction of filaments and their arrangement into the matrix constituting the film of the invention. The process involves applying liquid filaments of a flowable composition onto an aqueous medium to form the solid filaments. The density and arrangement of filaments provide the matrix structure of the film.

The flowable composition is a solution or dispersion of a pharmaceutically acceptable biodegradable thermoplastic polymer in a pharmaceutically acceptable organic solvent. The biodegradable thermoplastic polymer is substantially insoluble in an aqueous medium and body fluid. The organic solvent is slightly to completely soluble in aqueous medium.

The flowable composition is converted into liquid filaments by any process that is capable of converting the flowable composition into small multiple, separate volumes of solution or dispersion. These methods include, for example, spraying, misting, showering, drizzling, squirting, atomizing or aerosolizing. The preferred method of liquid filament formation is aerosolizing. The liquid filaments are applied onto the surface of an aqueous medium, preferably an aqueous medium having a high surface tension so that the liquid filaments rest upon its surface. The liquid filaments of flowable composition on the surface of the aqueous medium transform into solid filaments and the filaments are arranged to provide the matrix constituting the filamentous film.

While not intended as a limitation of the invention, it is believed that under ordinary circumstances, the contact of droplets of the flowable composition with an aqueous surface would form either a sheet or particles rather than filaments. However, by controlling the viscosity of the flowable composition, liquid filaments are formed and transform into solid filaments instead of a sheet or particles. Although the actual mechanism of this surprising result is not fully understood, the multiple small volumes of flowable composition are formed into liquid filaments during the application process when the viscosity of the flowable composition is within a certain range. These liquid filaments impact the aqueous surface and coagulate to form the overlapping solid filaments of the porous film.

Definitions

The term "biodegradable" means that the substance having this characteristic such as the thermoplastic polymer, will degrade over time by the action of enzymes, by hydrolytic action and/or by other similar mechanisms and include such characteristics as bioerodable and bioabsorbable.

The term "bioerodible," means that the substance having this characteristic such as the matrix, will erode or degrade at its surfaces over time due, at least in part, to contact with substances found in the surrounding tissue fluids or cellular action.

The term "bioabsorbable," means that the substance having this characteristic, such as thermoplastic polymer matrix, will be broken down and absorbed within the living body, for example, by a cell or tissue.

The terms "biocompatible" and "pharmaceutically acceptable" mean that the substance having these characteristics, such as the thermoplastic polymer, the solvent and the resulting filamentous porous film, will not cause substantial tissue irritation or necrosis at the implant site.

The term "flowable" means that the substance having this characteristic, such as the thermoplastic polymer solution, is manipulatable, may be transported through an orifice and is incapable of maintaining a definite shape. Flowable includes formulations with a low viscosity or water-like consistency to those with a high viscosity, such as a paste-like material. Advantageously, the flowability of the thermoplastic polymer formulation allows it to conform to irregularities, crevices, cracks, and/or holes on the aqueous medium.

"Special cellular function" means cell functions such as cell attachment, cell proliferation, and maintenance of cell differentiation.

The term "liquid filament" means a non-spherical, string-like or elongated volume of liquid material. The length may become much greater than the width when the viscosity of the flowable composition is sufficiently high or otherwise within a certain range.

"Applying liquid filaments" means using any method of producing liquid filaments such as spraying, misting, showering, drizzling, squirting, atomizing or aerosolizing.

Thermoplastic polymer

Thermoplastic polymers useful in this invention include thermoplastic polymers that are biodegradable. The thermoplastic polymers are substantially insoluble in an aqueous or body fluid medium but are capable of substantially dissolving in a water-soluble carrier, or solvent, to form the flowable composition. Upon contact between the flowable composition and an aqueous medium, the thermoplastic polymer component in the flowable composition will coagulate or precipitate to form a solid material, and the solvent component will dissipate into the aqueous medium. Flowable compositions with these characteristics have generally been described in U.S. Pat. Nos. 4,938,763; 5,077,049; 5,324,519; 5,632,727; 5,599,552; 5,702,716; 5,487,897; 5,660,849; 5,278,201; 5,198,220; 5,447,725 and 5,242,910, the disclosures of which are incorporated herein by reference.

Thermoplastic polymers that are suitable for use in the thermoplastic polymer solution generally include any having the foregoing characteristics. Suitable thermoplastic polymers include those with repeating functional group units in the polymer backbone, including but not limited to such functional group units as ester (including those formed from hydroxycarboxylic acids and those formed from polycarboxylic acids and polyols), amide (including those formed from aminocarboxylic acids and those formed from polycarboxylic acids and polyamines), urethane, carbonate, anhydride, esteramide, dioxanone, acetal, ketal, and phosphazene. Structural classes of such polymers are disclosed in U.S Pat. Nos. 4,938,763; 5,077,049; 5,324,519; 5,632,727; 5,599,552; 5,702,716; 5,487,897; 5,660,849; 5,278,201; 5,198,220; 5,447,725 and 5,242,910, the disclosures of which are incorporated herein by reference. Preferred thermoplastic polymers have repeating ester units within their backbones. Especially preferred thermoplastic polymers are those formed from such monomeric units as lactide, glycolide, caprolactone, hydroxybutyrate, C2 to C6 diol ester with a dicarboxylate selected from oxalate, malonate or succinate, and any combination thereof as a copolymer or terpolymer with random, ordered or block distribution of the various monomeric units.

The Brookfield relative viscosity measurement of the flowable composition indicates the concentration of thermoplastic polymer, the interaction between the thermoplastic polymer and solvent and the molecular weight of the thermoplastic polymer itself. The relative viscosity of the flowable composition determines how readily or how slowly it will flow. The relative viscosity also determines whether the flowable composition will form spherical droplets which coalesce into particles or sheets, or elongated droplets (liquid filaments) which coalesce into solid filaments. In general, the Brookfield relative viscosity of the flowable composition will range from about 1,000 to about 90,000 centipoise (cps) and preferably from 1,000 to about 10,000 cps in order to form the filamentous film of the invention.

Organic Solvent

Suitable organic solvents for use in the flowable composition are those which are pharmaceutically acceptable and will at least partially dissolve the thermoplastic polymer. According to the invention, the solvent has a solubility in aqueous medium, ranging from moderately soluble to completely miscible and is capable of diffusing into an aqueous medium such as water, hydrogel, agar and the like.

Classes of pharmaceutically acceptable organic solvents suitable for the present invention include aliphatic and alicyclic alcohols and polyols, aliphatic, alicyclic and aromatic esters, aliphatic and alicyclic lactams, aliphatic and alicyclic lactones, aliphatic and alicyclic amides, aliphatic and alicyclic carbonates, aliphatic and alicyclic acids, aliphatic and alicyclic ethers, aliphatic and alicyclic sulfoxides and sulfones, heterocyclic compounds, and aliphatic and alicyclic ketones. Examples of such organic solvents include those disclosed in U.S. Pat. Nos. 4,938,763; 5,077,049; 5,324,519; 5,632,727; 5,599,552; 5,702,716; 5,487,897; 5,660,849; 5,278,201; 5,198,220; 5,447,725 and 5,242,910, the disclosures of which are incorporated herein by reference. Specific examples include N-methyl-2-pyrrolidone (NMP), 2-pyrrolidone, propylene carbonate, ethylene carbonate, dimethyl carbonate, acetic acid, lactic acid, heptanoic acid, 2-ethoxyethyl acetate, ethyl acetate, methyl acetate, ethyl lactate, ethyl butyrate, diethyl malonate, diethyl glutonate, tributyl citrate, diethyl succinate, tributyrin, isopropyl myristate, dimethyl adipate, dimethyl succinate, dimethyl oxalate, dimethyl citrate, triethyl citrate, acetyl tributyl citrate, glyceryl triacetate, acetone, methyl ethyl ketone, 2-ethoxyethanol, ethylene glycol dimethyl ether, glycofurol, glycerol formal, 1,3-butyleneglycol, isopropylidene glycol (2,2-dimethyl-1,3-dioxolone-4-methanol; Solketal, dimethylformamide. dimethylacetamide; dimethylsulfoxide (DMSO), dimethylsulfone, tetrahydrofuran, ε-caprolactone, butyrolactone, caprolactam, such as N,N-dimethyl-m-toluamide, and 1-dodecylazacycloheptan-2-one and any mixture of two or more of the organic solvents.

The choice of solvent will also depend upon its rate of evaporation and the rate at which it promotes coagulation of thermoplastic polymer from the flowable composition. The rate of evaporation will affect the polymer concentration in the liquid filaments and will change the physical form of coagulation if the polymer concentration changes dramatically. Generally, the organic solvent is chosen so that minimal evaporation occurs during the liquid filament formation and transition to solid filaments. The rate of promotion of coagulation will depend upon the solubility of the organic solvent in water. The highly soluble solvents promote a rapid rate of coagulation while the slightly soluble solvents promote a slow rate of coagulation. Generally, the rate of coagulation will be moderate so that filament formation can occur.

The concentration of thermoplastic polymer in the flowable composition also affects the ability to form filaments. Generally, this concentration may range from about 0.01 gram of thermoplastic polymer per ml of solvent to an about saturated concentration, preferably from about 0.1 gram per ml to an about 2.0 gram per ml., more preferably from about 0.1 gram per ml to an about 0.7 gram per ml.

Formation of Filamentous Porous Film

In general, the filamentous porous film of the invention is formed by contacting the flowable composition with an aqueous medium, The flowable composition can be applied to the aqueous medium by any technique that converts the flowable composition into liquid filaments. For example, the flowable composition can be applied by spraying, misting, showering, drizzling, squirting, atomizing or aerosolizing. Aerosolization is a preferred method of administration because it minimizes the amount of flowable composition applied to the aqueous medium while maximizing uniformity and pore size. Typically, the flowable composition is placed in the reservoir of an atomizer or spray gun and aerosolized by inert gas pressure. The aerosol flow is directed toward the aqueous medium which it contacts and forms liquid filaments on the surface of the aqueous medium. The aqueous medium preferably has a high surface tension, high density and/or high viscosity so that the liquid filaments of flowable composition do not sink into the medium but rest upon its surface. Upon application of the liquid filaments to the aqueous medium, the liquid filaments convert into solid filaments as the thermoplastic polymer coagulates to a solid. The result is that the coagulating polymer adopts a filament form as a solid. The filamentous porous film generally has a thickness of about 10 μm to about 100 μm, more preferably from about 20 μm to about 50 μm.

Structure of the Filamentous Porous Film

The matrix structure of the filamentous porous film defines pores which are a minimum of about 1 μm in size. The pores also range in size from about 1 μm to about 30 μm, preferably from 5 to 10 μm. The filaments diameters are about 0.01–4 μm, preferably 0.1 to 2 μm and lengths of about 1 to 240 μm, preferably 1 to 100 μm. The pores are large enough to permit cells to attach and grow within the pores and the filamentous character of the film permits the nutrient medium to diffuse to and bathe all surfaces of the cell rather than only a portion such as the basal or apical portion.

The matrix structure of the film of the invention has two surfaces with the pores extending substantially uniformly throughout the matrix structure and from one surface to the other. Thus, the pores of the matrix structure communicate through the surfaces. Generally the filamentous porous film will have a porosity in the range of about 20% to about 90% throughout the entire matrix structure, preferably about 60% to 90%.

Use of the Filamentous Porous Film

The filamentous porous film can be used as a scaffold to allow cell growth and tissue engineering such as cell attachment, cell proliferation and maintenance of differentiated cellular function. For example the filamentous, porous film may be used as a scaffold for culturing oriented cells such as RPE cells or osteoblast cells. The filamentous, porous film used as such a scaffold has filament dimensions of 0.1–2 microns in diameter and 1 to 100 microns in length and the film has a porosity of 60 to 80% with pore sizes of 5 to 10 microns.

In use, the film is combined with a nutrient medium such as Dulbecco's minimum essential medium and the specialized cells transferred from living tissue to the film. Incubating the cell culture will allow the cells to attach, grow and multiply into the pores of interfilament spaces of the entire film. This construct of the filamentous porous film and specialized cells can be used for cellular transplant into patients. The construct will facilitate correct implantation and possibly correct orientation of the specialized cells. As degradation of the thermoplastic polymer proceeds, regenerated specialized cells with a proper function, and possibly a correct orientation will be established such that cellular interactions dependent upon the cellular functions and possibly the orientation will be re-established.

The invention has been described with reference to various specific and preferred embodiments and techniques. However, it should be understood that many variations and modifications may be made while remaining within the spirit and scope of the invention.

EXAMPLES

Example 1

Formation of Flowable Thermoplastic Polymer Solution

A thermoplastic copolymer poly(DL-lactide-co-glycolide) (PLG) with 50 mol % of the polymer being glycolide was dissolved in N-methyl-2pyrrolidone (NMP). The copolymer, with an intrinsic viscosity (IV) of 1.03 dl/g, can be purchased from Birmingham Polymers, Inc. (BPI). The copolymer solution, prepared by placing 20 g of the copolymer and 80 g of NMP in a glass jar, was initially mixed with a spatula or wooden stick. The nitrogen-purged jar was kept at room temperature for one hour and then placed in a room temperature shaker. The contents were shaken until all the polymer was in solution (generally 24 to 48 hours).

Examples 2–12

Additional copolymers of PLG, poly(DL-lactide-co-glycolide) with acid end groups (PLG-H) and poly(DLlactide-caprolactone) (PLC) were dissolved in NMP using the same procedure described in example 1. The copolymer manufacturers were either Birmingham Polymers, Inc. (BPI) or Boehinger Ingelheim (BI). The compositions, intrinsic viscosities, manufacturers and solution concentrations are summarized in Table 1.

TABLE 1

Summary of Flowable Compositions (Examples 1–12)

| Example | Copolymer | Copolymer Ratio | Intrinsic Viscosity | Manu-facturer | wt % |
|---|---|---|---|---|---|
| 1 | PLG | 50/50 | 1.03 dL/g | BPI | 20 |
| 2 | PLG | 50/50 | 0.7 dL/g | BPI | 20 |
| 3 | PLG | 50/50 | 0.26 dL/g | BPI | 20 |
| 4 | PLG | 75/25 | 1.08 dL/g | BPI | 20 |
| 5 | PLG | 75/25 | 0.72 dL/g | BPI | 20 |
| 6 | PLG | 75/25 | 0.31 dL/g | BPI | 20 |
| 7 | PLC | 75/25 | 0.74 dL/g | BPI | 20 |
| 8 | PLG | 65/35 | 1.02 dL/g | BPI | 20 |
| 9 | PLG | 65/35 | 0.65 dL/g | BPI | 20 |
| 10 | PLG | 65/35 | 0.36 dL/g | BPI | 20 |
| 11 | PLG-H | 50/50 | 0.4 dL/g | BI | 30 |
| 12 | PLG-H | 50/50 | 0.4 dL/g | BI | 20 |

Example 13

A film was prepared from the flowable composition in Example 1. The aerosol applicator (Air Brush, Badger Model 150) was connected to the propellant source (nitrogen gas) and cleaned for approximately 15 to 30 seconds by spraying acetone through the unit. Following complete removal of any acetone residue, a 1 cc vial containing the polymer formulation was attached to the applicator. The aerosol unit was activated over a sterile purified agar plate. The unit was held approximately 3 to 6 inches from the plate to avoid blowing the film from the agar plate and moved in a circular motion to ensure even coverage.

The aerosol unit was deactivated after 15 seconds. The activation time, which determines the film thickness, is based on the appearance of the film. That is, the surface will appear matted or flat when the thickness is about 50 μm but glossy when the thickness is greater than approximately 70 μm.

The agar plate was filled with approximately 25 ml of sterile water with a pipette to float the film above the agar surface and then rotated to allow water to flow underneath the film. To remove the film from the agar plate, a piece of Teflon was placed underneath the film with the assistance of sterile forceps. The Teflon piece and the film were transferred to a petri dish. Approximately 25 ml of sterile water was added to the petri dish allowing the removal of the Teflon piece. After 15 minutes, the rinse water was removed and the film was washed with an additional 25 ml of sterile water. A Teflon piece was placed underneath the film for removal from the petri dish. The film was dried overnight on the Teflon piece in a laminar flow hood.

The film was cut into smaller pieces (approximately 10×10 mm) and placed into a ATRISORB® case housing and placed into a nitrogen purged pouch. The film pieces were sterilized using gamma irradiation at 14 kGy +/−10%. This corresponds to a $10^{-6}$ sterility assurance level (SAL) with a bioburden level of approximately 1 CFU per film.

The film thickness, measured with digital calipers, varied from 35 to 60 μm (43 μm average) before irradiation and from 25 to 50 μm (35 μm average) after irradiation. The overall handling characteristics of the film was very good.

Example 13–24

Additional films were prepared from flowable compositions prepared in examples 2–12 using the procedure described for example 13. Table 2 contains a summary of the film characteristics.

TABLE 2

Summary of Film Characteristics

| Example | Flowable Composition | Volume used, μl | Spray Time, sec | Thickness pre-irradiation, μm[1] | Thickness after irradiation, μm[1] | Overall Handling Characteristics |
|---|---|---|---|---|---|---|
| 13 | Ex. 1 | 50 | 15 | 43 | 35 | very good |
| 14 | Ex. 2 | 100 | 10–15 | 37 | 33 | good; cracking |
| 15 | Ex. 3 | 75 | 5–10 | 10 | not measured | not good; very flaky |
| 16 | Ex. 4 | 25 | 15–20 | 28 | 34 | good/fair; sticky |
| 17 | Ex. 5 | 25 | not timed | 35 | 53 | fair; some stickiness |
| 18 | Ex. 6 | 50 | not timed | 31 | 35 | not good; cracking |
| 19 | Ex. 7 | 50 | not timed | not measured | not measured | not good; sticky |
| 20 | Ex. 8 | 25 | not timed | 28 | 19 | fair; very thin and sticky |
| 21 | Ex. 9 | 50 | not timed | 45 | 28 | not good; very brittle |
| 22 | Ex. 10 | 100 | not timed | 25 | not measured | not good; stuck to plate and fell apart |
| 23 | Ex. 11 | 25 | not timed | 29 | not measured | good; some stickiness |
| 24 | Ex. 12 | 50 | not timed | 31 | 25 | fair; brittle |

[1]Average

Examples 25–46

Flowable compositions of PLG, (PLG-H) and poly(DL-lactide) (PLA) were prepared as described in example 1. The polymer compositions, inherent viscosities, manufacturers and solution concentrations are summarized in Table 3.

TABLE 3

Summary of Flowable Compositions Examples 25–46)

| Example | Polymer | Copolymer Ratio | Intrinsic Viscosity | Manu-facturer | wt % |
|---|---|---|---|---|---|
| 25 | PLG | 50/50 | 1.03 dL/g | BPI | 10 |
| 26 | PLG | 50/50 | 1.03 dL/g | BPI | 20 |
| 27 | PLG | 50/50 | 1.03 dL/g | BPI | 30 |
| 28 | PLG | 50/50 | 0.26 dL/g | BPI | 10 |

TABLE 3-continued

Summary of Flowable Compositions Examples 25–46)

| Example | Polymer | Copolymer Ratio | Intrinsic Viscosity | Manufacturer | wt % |
|---|---|---|---|---|---|
| 29 | PLG | 50/50 | 0.26 dL/g | BPI | 20 |
| 30 | PLG | 50/50 | 0.26 dL/g | BPI | 30 |
| 31 | PLG | 75/25 | 0.31 dL/g | BPI | 10 |
| 32 | PLG | 75/25 | 0.31 dL/g | BPI | 20 |
| 33 | PLG | 75/25 | 0.31 dL/g | BPI | 30 |
| 34 | PLG | 75/25 | 1.08 dL/g | BPI | 10 |
| 35 | PLG | 75/25 | 1.08 dL/g | BPI | 20 |
| 36 | PLG | 75/25 | 1.08 dL/g | BPI | 30 |
| 37 | PLGH | 50/50 | 0.48 dL/g | BI | 10 |
| 38 | PLGH | 50/50 | 0.48 dL/g | BI | 20 |
| 39 | PLGH | 50/50 | 0.48 dL/g | BI | 30 |
| 40 | PLGH | 50/50 | 0.48 dL/g | BI | 40 |
| 41 | PLA | — | 0.33 dL/g | BPI | 10 |
| 42 | PLA | — | 0.33 dL/g | BPI | 20 |
| 43 | PLA | — | 0.33 dL/g | BPI | 30 |
| 44 | PLA | — | 0.83 dL/g | BPI | 10 |
| 45 | PLA | — | 0.83 dL/g | BPI | 20 |
| 46 | PLA | — | 0.83 dL/g | BPI | 30 |

Examples 47–68

Films were prepared from the flowable compositions prepared in examples 25–46. The aerosol applicator (Air Brush, Badger Model 150) was connected to the propellant source (nitrogen gas) and cleaned for approximately 15 to 30 seconds by spraying acetone through the unit. Following complete removal of any acetone residue, a 3 cc vial containing the polymer formulation was attached to the applicator. The aerosol unit was activated over a sterile purified agar plate. The unit was held approximately 3 to 6 inches from the plate to avoid blowing the film from the agar plate and a circular motion was used to ensure an even coverage.

The agar plate was filled with approximately 25 ml of sterile water with a pipette to float the film above the agar surface and then rotated to allow water to flow underneath the film. To remove the film from the agar plate, a piece of Teflon was placed underneath the film with the assistance of a sterile forceps. The Teflon piece and the film were transferred to a petri dish. Approximately 25 ml of sterile water was added to the petri dish allowing the removal of the Teflon piece. After 15 minutes, the rinse water was removed and the film was washed with an additional 25 ml of sterile water. A Teflon piece was placed underneath the film for removal from the petri dish. The film was dried overnight on the Teflon piece in a laminar flow hood.

Pieces of the film were placed in vials, frozen at −86° C. for approximately one hour, and lyophilized overnight to completely dry the films. The thickness was measure using digital calipers. The film was then mounted and coated with gold for viewing by scanning electron microscopy (SEM). The structure of the film was characterized and reported in Table 4.

The Brookfield relative viscosity was measured for each flowable composition.

TABLE 4

Characterization of Films (Examples 47–68)

Figure 6:
Figure 7:
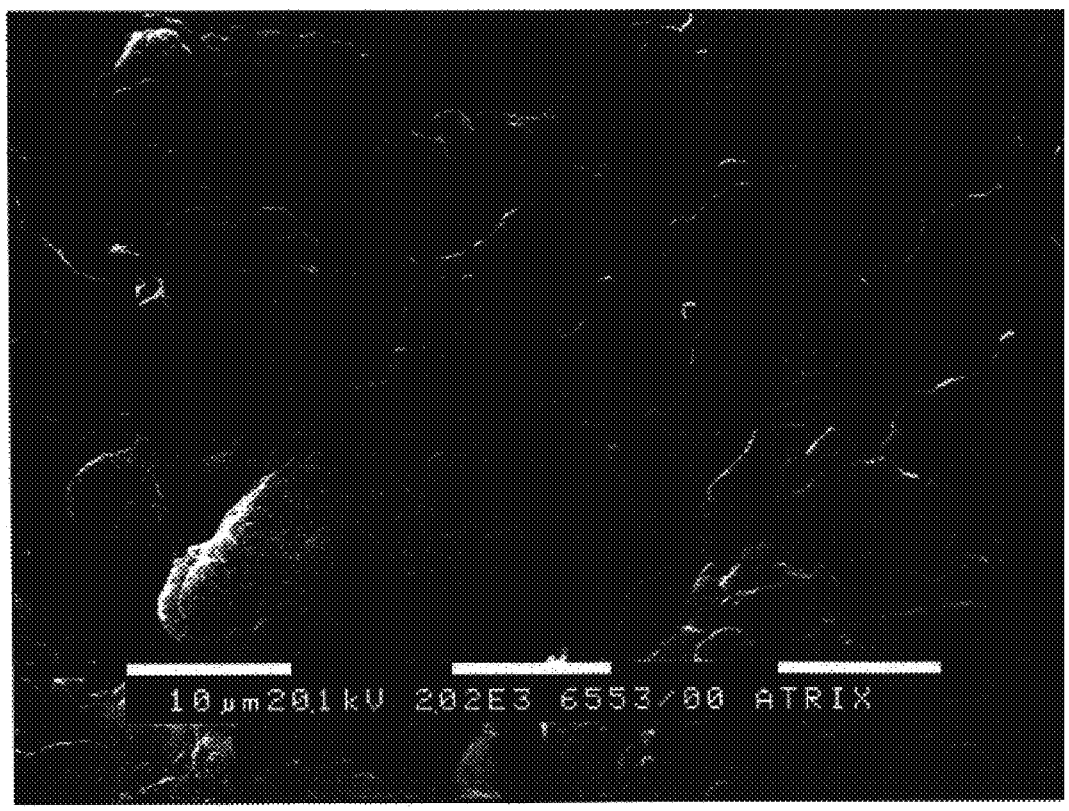
Figure 8:
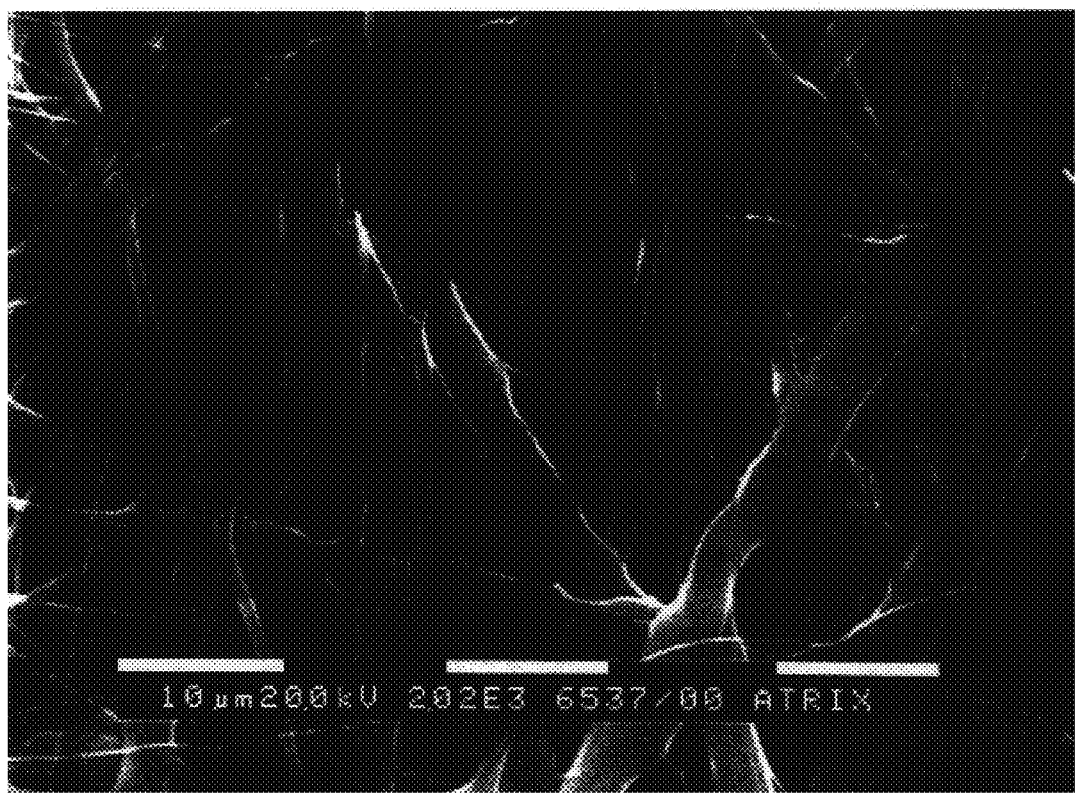
Figure 9:
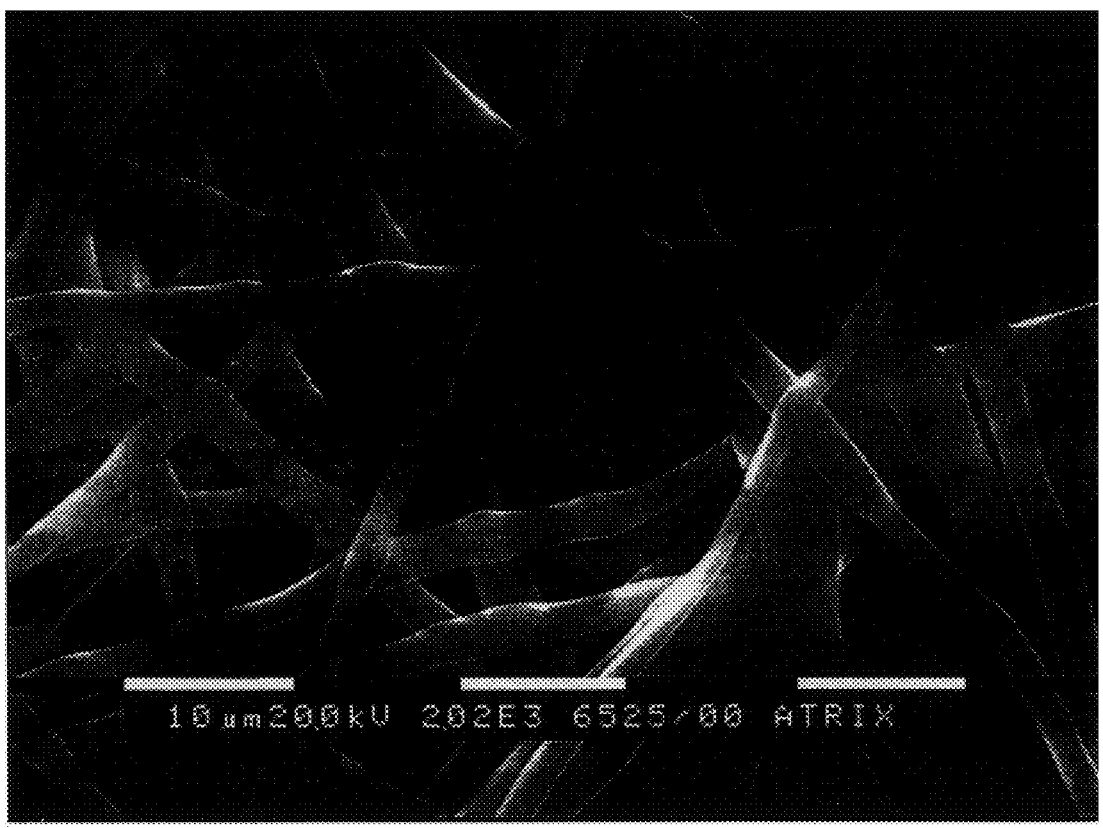

| Example | Flowable Composition | Thickness, μm | Brookfield Relative Viscosity, cps | Structure Characteristics |
|---|---|---|---|---|
| 47 | Ex. 25 | 90 | 112 | plate like material with foam like porous structure |
| 48 | Ex. 26 | 150 | 1,176 | filament structure with bead like masses |
| 49 | Ex. 27 | 310 | 72,160 | broad filaments that melt together |
| 50 | Ex. 28 | 310 | 24 | solid surface; no filaments |
| 51 | Ex. 29 | 170 | 40 | plate like material with foam like porous structure |
| 52 | Ex. 30 | 190 | 88 | plate like material with foam like porous structure |
| 53 | Ex. 31 | not measured | 16 | solid smooth surface; see FIG. 7 (2020X) |
| 54 | Ex. 32 | 130 | 64 | plate like structures |
| 55 | Ex. 33 | 150 | 248 | plate like structures with early stages of filament formation; see FIG. 6 (2020X) |
| 56 | Ex. 34 | 230 | 360 | plates with some underlying filaments |
| 57 | Ex. 35 | 210 | 8,526 | filament structure; starting to merge together; see FIG. 8 (2020X) |
| 58 | Ex. 36 | 430 | 86,880 | thick network with smaller rough and rigid filaments; tree like |
| 59 | Ex. 37 | 200 | 24 | foam like structure with plate formation |
| 60 | Ex. 38 | 140 | 280 | flat surface with sporadic pores; beginnings of filament formation |
| 61 | Ex. 39 | 1709 | 2696 | filaments with round sphere like masses |
| 62 | Ex. 40 | 70 | 19,840 | thick broad filaments laying over one another; see FIG. 9 (2020X) |
| 63 | Ex. 41 | 130 | 16 | very small spheres in a porous structure; foam |
| 64 | Ex. 42 | 110 | 48 | core flat plate formation |
| 65 | Ex. 43 | 200 | 192 | flat plates melting into a solid structure |
| 66 | Ex. 44 | 80 | 80 | large pores; foam structure with plate like structure |
| 67 | Ex. 45 | 70 | 1,304 | filaments laying on top of each other; melting and branching characteristics |
| 68 | Ex. 46 | 50 | 15,110 | thick broad filaments with some melting together |

Examples 69–77

Films from examples 13–23 were evaluated for in vitro growth of human osteoblast cells. Osteoblasts were allowed to grow for three weeks in cell growth medium RPMI 1640 with 10% fetal calf serum and 2 mM glutamine. The film clinical handling characteristics as well as osteoblast attachment and growth were evaluated. The results are summarized in Table 5.

TABLE 5

Osteoblast Cell Growth on Films:
Film Handling (Examples 69–77)

| Example | Film | Sticking Before Hydration | Sticking After Hydration | Curling Before Hydration | Curling After Hydration |
|---|---|---|---|---|---|
| 69 | Ex. 13 | slight | moderate | slight | slight |
| 70 | Ex. 14 | moderate | moderate | none | moderate |
| 71 | Ex. 16 | moderate | moderate | slight | moderate |
| 72 | Ex. 17 | none | none | moderate | severe |
| 73 | Ex. 18 | moderate | moderate | none | — |
| 74 | Ex. 20 | slight | none | moderate | severe |
| 75 | Ex. 21 | moderate | severe | slight | slight |
| 76 | Ex. 22 | slight | moderate | slight | slight |
| 77 | Ex. 23 | slight | severe | moderate | moderate |

TABLE 6

Osteoblast Cell Growth on Films:
Growth Results (Examples 69–77)

| Example | Film | Overall Cell Growth | Cell Growth on Both Sides of Film | Nodule Present | Cells Inside Film | Good Cell Growth Around Film | Overall Evaluation |
|---|---|---|---|---|---|---|---|
| 69 | Ex. 13 | 10+ | yes | yes | yes | yes | very good |
| 70 | Ex. 14 | 7–8+ | yes | yes | yes | yes | good/fair |
| 71 | Ex. 16 | 5+ | ND | no | ND | yes | good |
| 72 | Ex. 17 | 3+ | ND | no | ND | no | fair |
| 73 | Ex. 18 | 5+ | ND | no | ND | no | fair/poor |
| 74 | Ex. 20 | 3+ | ND | no | ND | no | fair |
| 75 | Ex. 21 | 6+ | yes | no | yes | yes | fair |
| 76 | Ex. 22 | 5+ | ND | no | ND | yes | fair |
| 77 | Ex. 23 | 9–10+ | yes | yes | yes | yes | very good |

Examples 78–86

Films from examples 13–23 were evaluated for in vitro growth of Human Fetal Retinal Pigment Epithelial Spheroids (HFRPE). Sheets of HFRPE cells were isolated and loosely attached to the films in the presence of Dulbecco's minimum essential medium. Within 48 to 72 hours, the cells attached themselves firmly to the polymer films. The HFRPE cells proliferated and covered each piece of film tested. The cells did not dedifferentiate, an important indication that the films provide a suitable attachment structure. They possessed a cuboidal morphology with numerous apical microvilli. The HFRPE cells produced extracellular matrix (collagen type IV) at their basal side, filling the pores of the film. All the isolated cells were pigmented and expressed cytokeratine. In vivo, the transplanted films degraded within 2–3 weeks without any signs of inflammation in rabbit eyes.

TABLE 7

HFRPE Cell Growth on Films
Film Handling (Examples 78–86)

| Example | Film | Sticking Before Hydration | Sticking After Hydration | Curling Before Hydration | Curling After Hydration |
|---|---|---|---|---|---|
| 78 | Ex. 13 | slight | slight | none | slight |
| 79 | Ex. 14 | very slight | very slight | none | none |
| 80 | Ex. 16 | slight | very slight | very slight | very slight |
| 81 | Ex. 17 | slight | very slight | none | slight |
| 82 | Ex. 18 | none | very slight | none | none |
| 83 | Ex. 20 | very slight | none | none | none |
| 84 | Ex. 21 | none | none | none | slight |
| 85 | Ex. 22 | slight | very slight | none | very slight |
| 86 | Ex. 23 | very slight | very slight | very slight | very slight |

TABLE 8

HFRPE Cell Growth on Films
Growth Results Examples 79–86)

| Example | Film | Cell Adhesion | Cell Proliferation on Plate | Overall Evaluation |
|---|---|---|---|---|
| 78 | Ex. 13 | yes | yes | very best |
| 79 | Ex. 14 | could not manipulate | could not manipulate | brittle |
| 80 | Ex. 16 | could not manipulate | could not manipulate | brittle |
| 81 | Ex. 17 | yes | yes | not given |
| 82 | Ex. 18 | could not manipulate | could not manipulate | brittle |
| 83 | Ex. 20 | yes | yes | not given |
| 84 | Ex. 21 | yes | yes | not given |
| 85 | Ex. 22 | yes | yes | not given |
| 86 | Ex. 23 | yes | no | not given |

Example 87

SEM Photos

Films prepared as examples 13, 15, 18 and 23 were place in vials, frozen at −86° C. for approximately one hour, and lyophilized overnight to completely dry the films. The thickness was measured using digital calipers. The films were then mounted and coated with gold for viewing by scanning electron microscopy (SEM). The structure of each film was characterized.

Figure 2:
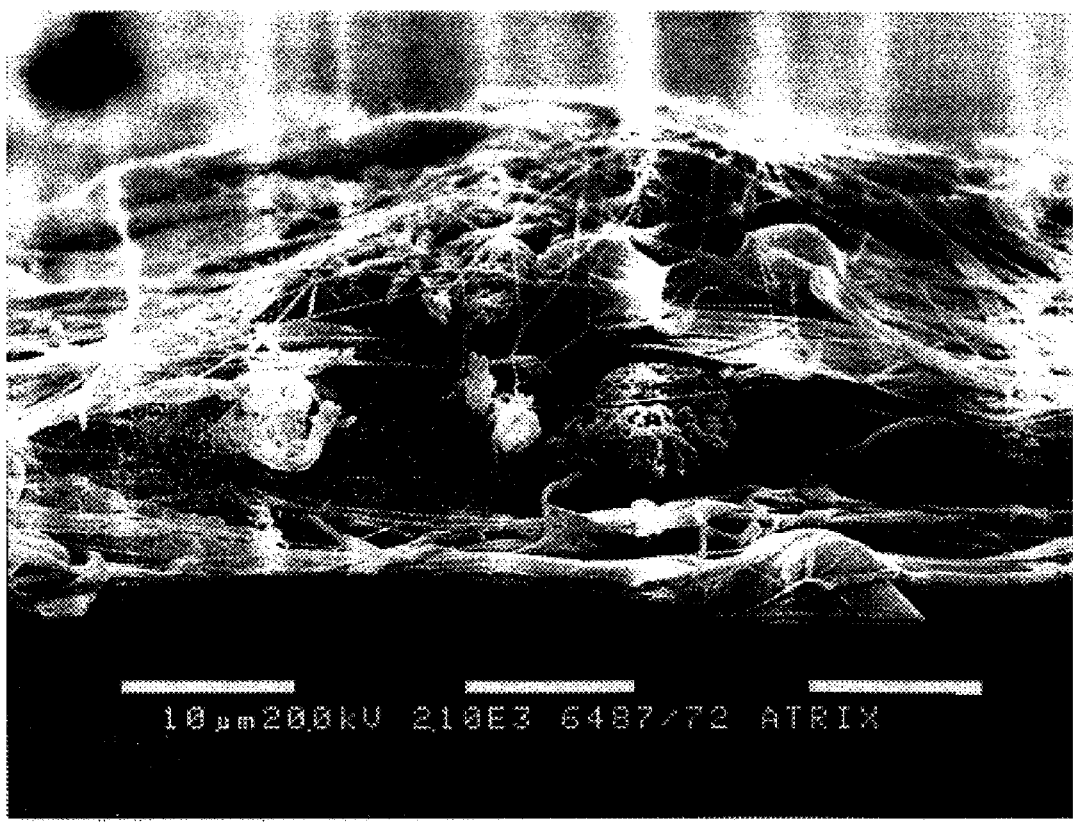
Figure 3:
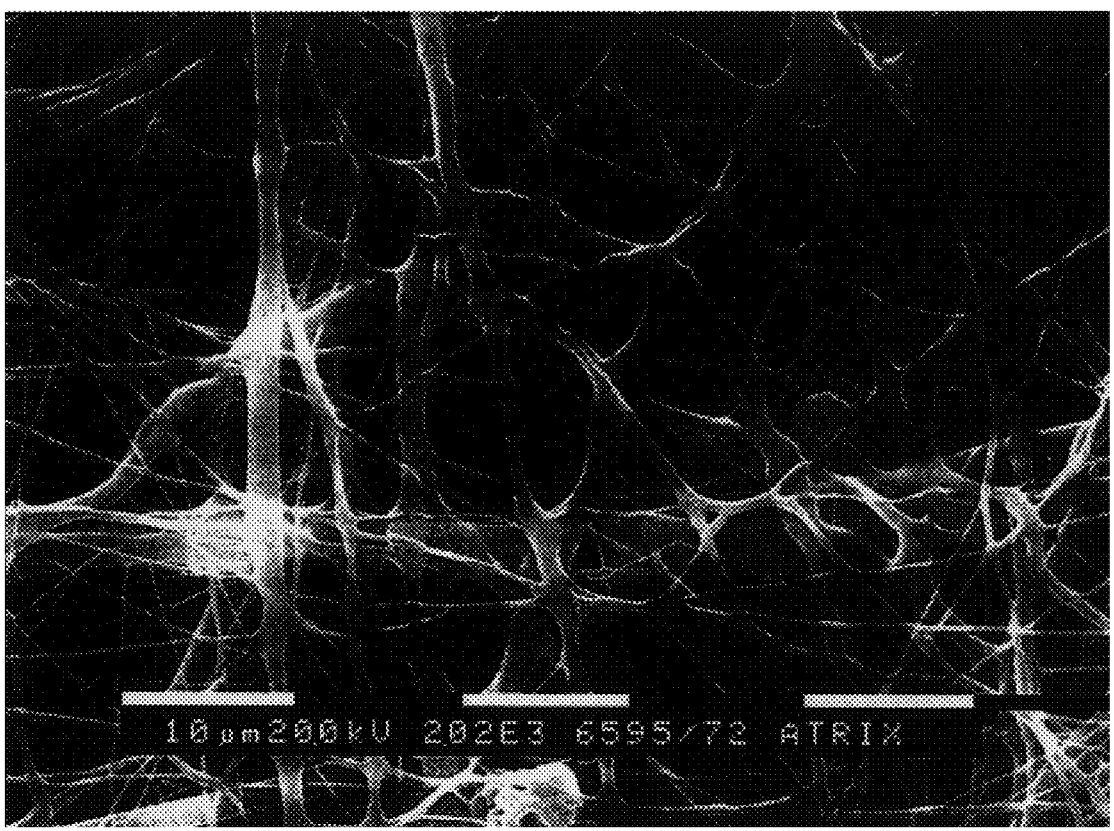

The film from example 13 can be seen in FIG. 1 (2020X) and FIG. 2 (cross-section 2100X). The film is composed of many filaments of varying widths that weave together to form a mesh-like matrix. The film from example 23 can be seen in FIG. 3 (2020X). Again, the example 23 film is composed of filaments forming a mesh-like matrix. Example 23 appears to have larger filaments than example 13. Both films have void spaces between the filaments larger than 10 µm, an optimal size for cells to attach and proliferate.

Figure 4:
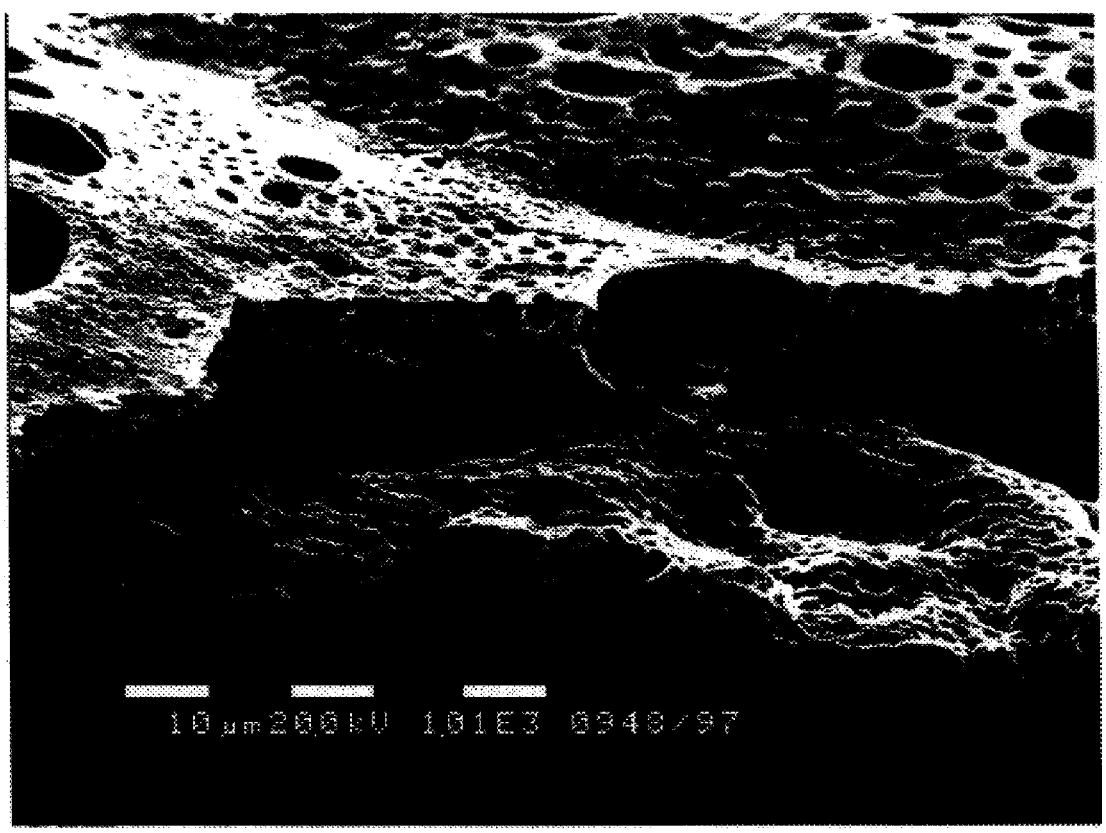
Figure 5:
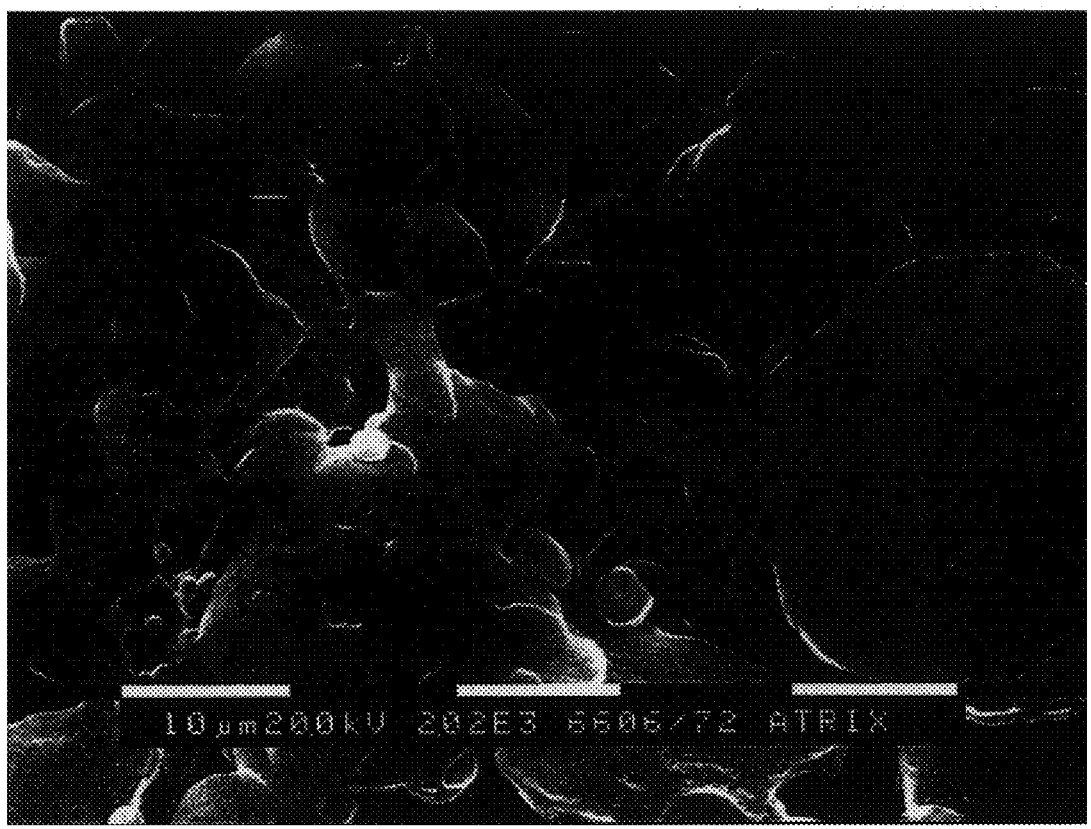

The film from example 15 can be seen in FIG. 4 (1010X). This film was too brittle for cell growth experiment and appears porous on one side but non-porous on the opposite side. The film from example 18 can be seen in FIG. 5 (2020X). This film had a predominately smooth, plate-like surface and some very small pores. Neither example 15 nor 18 had pores that extending from one side of the polymer to the other side. Likewise, neither film was filamentous.

What is claimed is:

1. A process for preparing a filamentous porous mesh, comprising:

applying small multiple volumes of a flowable composition onto an aqueous medium to form a matrix structure of filaments, wherein the flowable composition comprises a pharmaceutically acceptable, biodegradable thermoplastic polymer that is substantially insoluble in an aqueous body fluid medium, dissolved or dispersed in a pharmaceutically acceptable organic solvent that is moderately soluble to completely miscible in the aqueous or body fluid medium, and the Brookfield relative viscosity of the flowable composition is 1,000 to 90,000 centipoise.

2. A process of claim 1, wherein the concentration of thermoplastic polymer is about 10 to 50 wt % in the organic solvent.

3. The process of claim 1, wherein the thermoplastic polymer is bioerodible.

4. A process of claim 1, wherein the thermoplastic polymer contains repeating functional group units in its polymer backbone, which are selected from hydroxycarboxylic acid ester, polycarboxylic acid and polyol ester, aminocarboxylic acid amide, polycarboxylic acid and polyamine amide, urethane, carbonate, anhydride, esteramide, dioxanone, acetal, ketal, phosphazene and any combination thereof.

5. A process of claim 4, wherein the thermoplastic polymer is formed from at least one monomeric unit selected from the group consisting of lactide, glycolide, caprolactone, hydroxybutyrate, and $C_2$ to $C_6$ diol ester with a dicarboxylate selected from oxylate, malonate and succinate, and any combination thereof as a copolymer or terpolymer with random, ordered or block distribution of the various monomeric units.

6. A process of claim 5, wherein the thermoplastic polymer is poly(DL-lactide-co-glycolide).

7. A process of claim 1, wherein the organic solvent is selected from the group consisting of aliphatic and alicyclic alcohols and polyols, aliphatic, alicyclic and aromatic esters, aliphatic and alicyclic lactams, aliphatic and alicyclic lactones, aliphatic and alicyclic amides, aliphatic and alicyclic carbonates, aliphatic and alicyclic acids, aliphatic and alicyclic ethers, aliphatic and alicyclic sulfoxides and sulfones, heterocyclic compounds, and aliphatic and alicyclic ketones.

8. A process of claim 7, wherein the organic solvent is N-methyl-2-pyrrolidone.

9. The process of claim 1, wherein the step of applying the small multiple volumes of flowable composition comprises spraying, misting, showering, drizzling, squirting, atomizing or aerosolizing the flowable composition.

10. The process of claim 9, wherein the step of applying the small multiple volumes of flowable composition comprises aerosolizing the flowable composition.

11. The process of claim 1, wherein the aqueous medium is a hydrogel.

12. The process of claim 11, wherein the hydrogel is agar.

13. A filamentous, porous mesh, comprising:

a matrix structure of filaments, interfilament spaces and two surfaces;

wherein the interfilament spaces define pores extending from one surface to the other, the pores have cross sectional dimensions which do not substantially change from one surface to the other, and the filaments comprise a pharmaceutically acceptable biodegradable thermoplastic polymer that is substantially insoluble is aqueous fluid or body fluid.

14. The filamentous porous mesh of claim 13, wherein the thermoplastic polymer contains repeating functional group units in its polymer backbone, which are selected from hydroxycarboxylic acid ester, polycarboxylic acid and polyol ester, aminocarboxylic acid amide, polycarboxylic acid and polyamine amide, urethane, carbonate, anhydride, esteramide, dioxanone, acetal, ketal, phosphazene and any combination thereof.

15. The filamentous porous mesh of claim 14, wherein the thermoplastic polymer is formed from at least one monomeric unit selected from the group consisting of lactide, glycolide, caprolactone, hydroxbutyrate, $C_2$ to $C_6$ diol ester with a dicarboxylate selected from oxalate, malonate and succinate, and any combination thereof as a copolymer or terpolymer with random, ordered or block distribution of the various monomeric units.

16. A filamentous porous mesh of claim 15, wherein the thermoplastic polymer is poly(DL-lactide-co-glycolide).

17. A filamentous, porous mesh of claim 13, wherein the filaments have diameters of about 0.01 to about 4 mm.

18. A filamentous, porous mesh of claim 13, wherein the filaments have lengths of about 1 to about 240 mm.

19. A filamentous, porous mesh of claim 13, wherein the filamentous porous mesh has a thickness of about 10 to about 100 mm.

20. A filamentous, porous mesh of claim 19, wherein the filamentous porous mesh has a thickness of about 20 to about 50 mm.

21. A filamentous porous mesh of claim 13, wherein the pores have a cross-sectional dimension of about 5 to 30 mm.

* * * * *

UNITED STATES PATENT AND TRADEMARK OFFICE
CERTIFICATE OF CORRECTION

PATENT NO. : 6,245,345 B1
DATED : June 12, 2001
INVENTOR(S) : Richard L. Dunn et al.

It is certified that error appears in the above-identified patent and that said Letters Patent is hereby corrected as shown below:

Column 1,
Line 49, insert -- having the appearance of a mesh -- after "film".
Line 55, delete "whose" and insert -- those --, therefor.
Line 57, insert -- having the appearance of a mesh -- between "structure" and "with two".

Column 2,
Line 28, insert -- having the appearance of a mesh -- after "matrix".

Column 12,
Line 40, insert -- ( -- before "Examples 79-86".

Column 13,
Lines 2 and 4, delete "mesh-like" and insert -- mesh --, therefor.
Line 20, insert -- mesh -- between "a" and "matrix".
Line 24, insert -- or -- between "aqueous" and "body".

Column 14,
Line 7, insert -- mesh -- between "a" and "matrix".
Lines 20-22, delete "the pores have cross sectional dimensions which do not substantially change from one surface to the other, and" and insert -- the pores are at least about 1 micron in cross sectional dimension, and --, therefor.
Line 25, delete "is" after "insoluble" and insert -- in -- therefor.

Signed and Sealed this

Twenty-sixth Day of August, 2003

JAMES E. ROGAN
*Director of the United States Patent and Trademark Office*